United States Patent
Yamagishi et al.

(10) Patent No.: US 11,063,678 B2
(45) Date of Patent: Jul. 13, 2021

(54) RECEPTION APPARATUS AND DATA PROCESSING METHOD

(71) Applicant: Saturn Licensing LLC, New York, NY (US)

(72) Inventors: Yasuaki Yamagishi, Kanagawa (JP); Tatsuya Igarashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/096,545

(22) PCT Filed: Apr. 28, 2017

(86) PCT No.: PCT/JP2017/016989
§ 371 (c)(1),
(2) Date: Oct. 25, 2018

(87) PCT Pub. No.: WO2017/195668
PCT Pub. Date: Nov. 16, 2017

(65) Prior Publication Data
US 2020/0153520 A1 May 14, 2020

(30) Foreign Application Priority Data
May 13, 2016 (JP) .............................. JP2016-097312

(51) Int. Cl.
*H04H 60/40* (2008.01)
*H04H 60/73* (2008.01)
*H04L 29/06* (2006.01)

(52) U.S. Cl.
CPC ............ *H04H 60/40* (2013.01); *H04H 60/73* (2013.01); *H04L 65/608* (2013.01)

(58) Field of Classification Search
CPC ...... H04H 60/40; H04H 60/73; H04L 65/608; H04N 21/4305
See application file for complete search history.

(56) References Cited

U.S. PATENT DOCUMENTS

| 2011/0276648 A1* | 11/2011 | Soldan ...................... G06F 1/12 709/208 |
| 2014/0195651 A1* | 7/2014 | Stockhammer ...... H04N 21/242 709/219 |
| 2018/0213270 A1* | 7/2018 | Ng ..................... H04N 21/4382 |

FOREIGN PATENT DOCUMENTS

| JP | 2002-175129 A | 6/2002 |
| JP | 2013-85139 A | 5/2013 |
| JP | 2014-230154 A | 12/2014 |

OTHER PUBLICATIONS

International Search Report dated Aug. 8, 2017, in PCT/JP2017/016989, filed Apr. 28, 2017.
(Continued)

*Primary Examiner* — John R Schnurr
(74) *Attorney, Agent, or Firm* — Oblon, McClelland, Maier & Neustadt, L.L.P.

(57) ABSTRACT

The present technology relates to a reception apparatus and a data processing method that ensure reliable reproduction of content.
The reception apparatus receives content, and controls reproduction of the content on the basis of time correspondence information associating first time information provided from a transmission side of the content with second time information generated on a reception side of the content by a time axis according to the first time information corresponding to the second time information. The present technology can be applied to a television receiver compatible with ATSC 3.0, for example.

16 Claims, 21 Drawing Sheets

(56) References Cited

OTHER PUBLICATIONS

"ATSC Proposed Standard: Physical Layer Protocol (A/322)" http://www.atsc.org/wp-content/uploads/2015/10/A322S32-230r56-Physical-Layer-Protocol.pdf, Jun. 29, 2016, 13 pages.

"ATSC Candidate Standard: Signaling, Delivery Synchronization, and Error Protection (A/331)", http://www.atsc.org/wp-content/uploads/2016/02/S33-174r1-Signaling-Delivery-Sync-FEC.pdf, Feb. 2, 2016, 12 pages.

* cited by examiner

FIG. 6

| Syntax | # of bits | Format |
|---|---|---|
| L1_Basic_signaling() { | | |
| L1_content_tag | 2 | uimsbf |
| L1_version | 3 | uimsbf |
| L1_slt_flag | 1 | uimsbf |
| L1B_time_info_flag | 2 | uimsbf |
| L1_papr | 2 | uimsbf |

| Value | Meaning |
|---|---|
| 00 | Time information is not included in the current frame |
| 01 | Time information is included in the current frame and signaled to ms precision |
| 10 | Time information is included in the current frame and signaled to us precision |
| 11 | Time information is included in the current frame and signaled to ns precision |

FIG. 7

| Syntax | # of bits | Format |
|---|---|---|
| L1 Detail signaling() { | | |
|   L1D_version | 4 | uimsbf |
|   L1D_num_rf | 3 | uimsbf |
|   for L1D_rf_id=1..L1D_num_rf { | | |
|     L1D_rf_frequency | 19 | uimsbf |
|   } | | |
|   for i=0..L1B_num_subframes { | | |

| | | |
|---|---|---|
| if(L1B_time_info_flag!=00){ | | |
|   L1D_time_sec | 32 | uimsbf |
|   L1D_time_msec | 10 | uimsbf |
|   if(L1B_time_info_flag!=01){ | | |
|     L1D_time_usec | 10 | uimsbf |
|     if(L1B_time_info_flag!=10){ | | |
|       L1D_time_nsec | 10 | uimsbf |
|     } | | |
|   } | | |
| } | | |

FIG. 8

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch(LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |

FIG. 9

| Element or Attribute Name | Use | Data Type | Description |
|---|---|---|---|
| SystemTime | 1 | | |
| @currentUtcOffset | 1 | unsignedByte | The current offset in whole seconds between TAI and UTC. |
| @ptpPrepend | 0..1 | unsignedShort | Signals the upper 16 bits of the 48-bit count of PTP seconds. |
| @leap59 | 0..1 | boolean | Indicates a pending 59-second leap second event |
| @leap61 | 0..1 | boolean | Indicates a pending 61-second leap second event |
| @utcLocalOffset | 1 | duration | Indicates the offset between the local time zone of the originating broadcast station, and UTC. |
| @dsStatus | 0..1 | boolean | Indicates that Daylight Saving Time is in effect |
| @dsDayOfMonth | 0..1 | unsignedByte (range 1..31) | Indicates the local day of the month on which the transition into or out of daylight saving time is to occur. |
| @dsHour | 0..1 | unsignedByte (range 0..24) | Indicates the local hour at which the transition into or out of daylight saving time is to occur (0-24). |

FIG. 15

GetBroadcastTime REQUEST method: "org.atsc.query.broadcasttime"
params: omitted

FIG. 16

MESSAGE OF GetBroadcasttime REQUEST

{
  "jsonrpc": "2.0",
  "method": "org.atsc.query.broadcastTime",
  "id": 37
}

FIG. 17

GetBroadcastTime RESPONSE result: a JSON object containing broadcastTime and corresponding SystemTime pair
result JSON Schema:
{
  "type": "object",
  "properties": {
    "broadcastTime": {"type": "string"},
    "systemTime": {"type": "string"},
  },
  "required": ["broadcastTime","systemTime"]
} broadcastTime: The wall clock time in the broadcast stream.
systemTime: The system time when the broadcast time is captured. Date&Time that JS accesses uses the same timeline of this system time.

FIG. 18

MESSAGE OF GetBroadcasttime RESPONSE

{
"jsonrpc": "2.0",
"result": [{"broadcastTime": "Thu Apr 28 2016 10:31:14 GMT+0900", "systemTime": "Thu Apr 28 2016 10:31:28 GMT+0900"}],
"id": 37
}

RECEPTION APPARATUS AND DATA PROCESSING METHOD

TECHNICAL FIELD

The present technology relates to a reception apparatus and a data processing method, and particularly relates to a reception apparatus and a data processing method capable of reliably reproducing content.

BACKGROUND ART

In reproducing content distributed from a server on a transmission side by a client apparatus on a reception side, it is necessary to achieve synchronization of time information in a case where the time information is shared by the transmission side and the reception side (for example, refer to Patent Document 1).

CITATION LIST

Patent Document

Patent Document 1: Japanese Patent Application Laid-Open No. 2014-230154

SUMMARY OF THE INVENTION

Problems to be Solved by the Invention

Meanwhile, there is a case where synchronization of the time information between the transmission side and the reception side is difficult depending on an environment of the client apparatus, and there have been demands for a proposal for enabling the content to be reliably reproduced even in such a case.

The present technology has been made in view of such a situation, and aims to enable reliable reproduction of content.

Solutions to Problems

A reception apparatus according to an aspect of the present technology is a reception apparatus including: a reception unit that receives content; and a control unit that controls reproduction of the content on the basis of time correspondence information associating first time information provided from a transmission side of the content with second time information generated on a reception side of the content by a time axis according to the first time information corresponding to the second time information.

A reception apparatus according to an aspect of the present technology may be a separate apparatus or an internal block forming one apparatus. Moreover, a data processing method according to an aspect of the present technology is a data processing method corresponding to the reception apparatus of one aspect of the present technology described above.

In the reception apparatus and the data processing method according to an aspect of the present technology, content is received, and reproduction of the content is controlled on the basis of time correspondence information associating first time information provided from a transmission side of the content with second time information generated on a reception side of the content by a time axis according to the first time information corresponding to the second time information.

Effects of the Invention

According to an aspect of the present technology, content can be reliably reproduced.

Note that effects described herein are non-restricting. The effects may be any effects described in the present disclosure.

BRIEF DESCRIPTION OF DRAWINGS

FIG. 6 is a diagram illustrating an example of syntax of L1 basic information.

FIG. 7 is a diagram illustrating an example of syntax of L1 detailed information.

FIG. 8 is a diagram illustrating an example of syntax of an LLS table.

FIG. 9 is a diagram illustrating a configuration example of a SystemTime element.

FIG. 15 is a diagram illustrating an example of a definition of a GetBroadcastTime request.

FIG. 16 is a diagram illustrating an example of a message of GetBroadcastTime request.

FIG. 17 is a diagram illustrating an example of a definition of GetBroadcastTime response.

FIG. 18 is a diagram illustrating an example of a message of GetBroadcastTime response.

MODE FOR CARRYING OUT THE INVENTION

Figure 1:
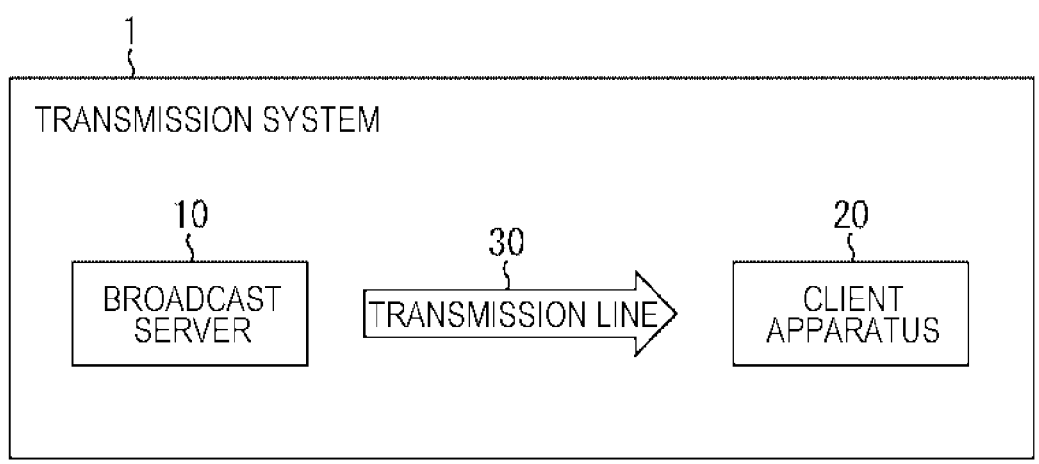
FIG. 1 is a diagram illustrating a configuration a transmission system according to an embodiment of the present technology.

Hereinafter, embodiments of the present technology will be described with reference to the drawings. Note that the description will be given in the following order.

1. System configuration
2. Outline of the present technology
3. Time information processed by client apparatus
4. Messaging between application and broadcast middleware 5. Processing flow executed on client apparatus
6. Modification
7. Configuration of computer <1. System Configuration>

(Exemplary Configuration of Transmission System)

FIG. 1 is a diagram illustrating a configuration a transmission system to which the present technology is applied according to an embodiment. Note that the term "system" means a logical set of a plurality of apparatuses.

In FIG. 1, the transmission system 1 is constituted with a broadcast server 10 and a client apparatus 20.

The broadcast server 10 is a transmitter that transmits content such as a television program and a commercial message via a transmission line 30. The broadcast server 10 transmits a broadcast stream containing video and audio data forming the content and signaling as broadcast waves (simultaneous broadcast distribution).

The client apparatus 20 is a receiver that receives the content transmitted from the broadcast server 10 via the transmission line 30. The client apparatus 20 receives the broadcast waves from the broadcast server 10, obtains video and audio data forming the content and the signaling from the broadcast stream, and reproduces a video image and sound of the content such as a television program.

For example, the transmission system 1 performs data transmission conforming to a predetermined broadcast standard such as Advanced Television Systems Committee (ATSC) 3.0 currently under formulation. Furthermore, the transmission system 1 may use the transmission line 30 of a terrestrial broadcast, and other broadcast such as a satellite broadcasting using a broadcast satellite (BS), a communication satellite (CS), or a cable broadcast (CATV) using a cable.

Here, while the illustration of the transmission system 1 of FIG. 1 includes one client apparatus 20 to simplify the description, it is allowable to provide a plurality of the client apparatuses 20. In practice, broadcast waves transmitted (simultaneously distributed) by the broadcast server 10 are simultaneously received by the plurality of client apparatuses 20 installed in different places via the transmission line 30.

In addition, it is also allowable to provide a plurality of the broadcast servers 10. Each of the plurality of broadcast servers 10 can transmit broadcast waves including a broadcast stream in a separate frequency band as a separate channel (service), for example, and the client apparatus 20 can select a channel for receiving the broadcast stream from among individual channels of the plurality of broadcast servers 10.

<2. Outline of Present Technology>

Meanwhile, in order to reproduce the content distributed from the broadcast server 10 as streaming distribution by the client apparatus 20, time information (absolute time) supplied from the broadcast server 10 needs to be shared by the broadcast server 10 and the client apparatus 20 to achieve synchronization. The precise absolute time that needs to be shared by the broadcast server 10 and the client apparatus 20 is also referred to as a wall clock time (WallClockTime).

One example of this type of time synchronization method is a method in which each of the broadcast server 10 and the client apparatus 20 obtains time information from an external clock source using Network Time Protocol (NTP) or the like, to achieve synchronization of time. In order to use the NTP protocol, however, both the broadcast server 10 and the client apparatus 20 need to be connected to the network. For example, NTP protocol cannot be used in a case where the client apparatus 20 has a function of receiving distributed broadcast content alone (in a case where no communication function is provided).

On the other hand, in a case where the client apparatus 20 is a personal computer, a tablet type terminal apparatus, or a smartphone, for example, it would not be easy to change the system clock (system time) from an application executed on the apparatus. Still, there is a demand for achieving implementation of an application as a player for reproducing content even in such an environment.

In this manner, there is a demand for a proposal for a technology for reproducing on the client apparatus 20 the content to be distributed in streaming distribution by sharing time information with the broadcast server 10 even in an environment where the NTP protocol or the like cannot be used and the system time cannot be easily changed from the application under execution, for example. Accordingly, in order to cope with these demands, the present technology is intended to make proposals to be described below.

(Overview of Content Reproduction Control of the Present Technology)

Figure 2:
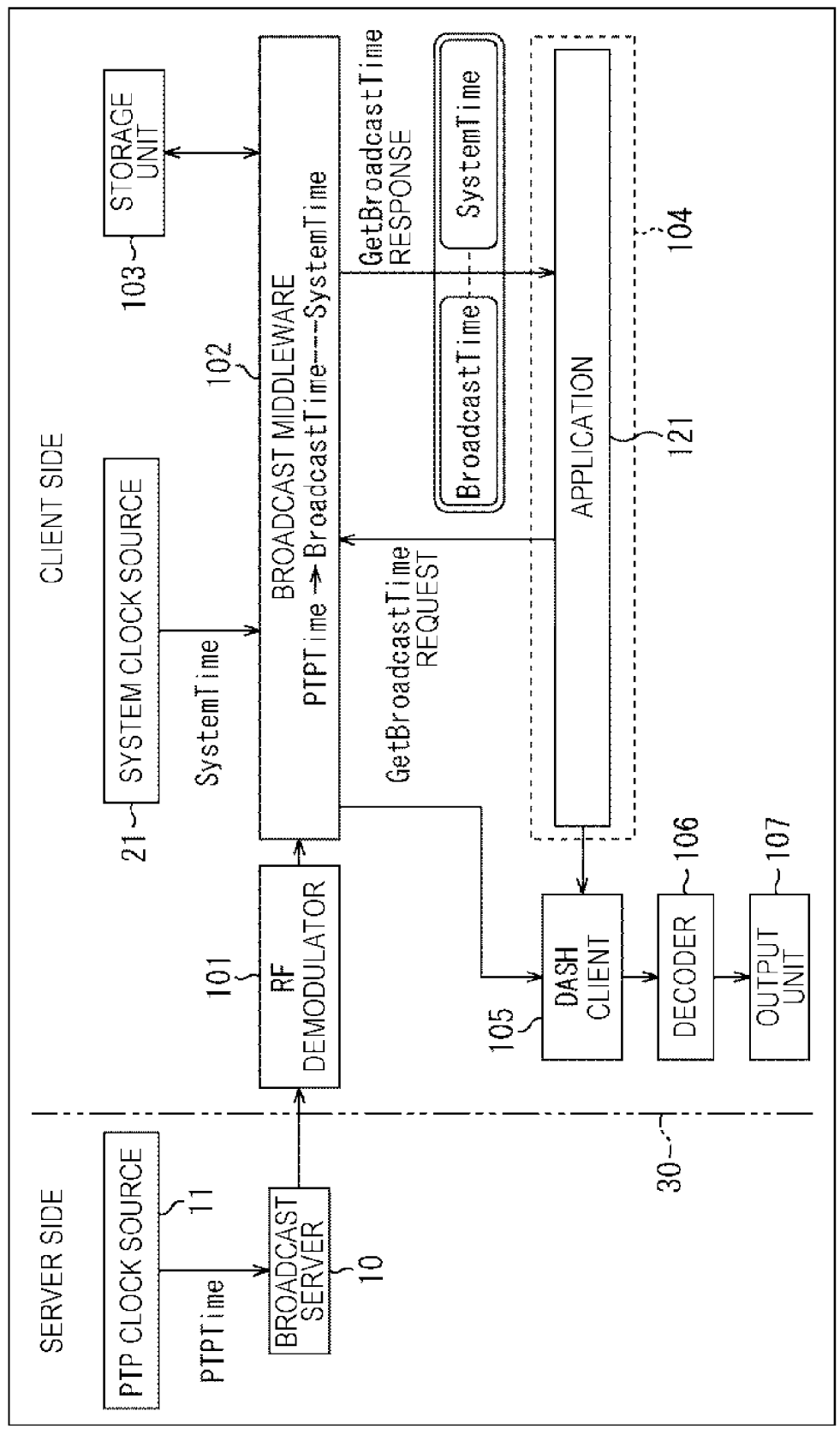
FIG. 2 is a diagram illustrating an outline of content reproduction control according to the present technology.

FIG. 2 is a diagram illustrating an outline of content reproduction control according to the present technology.

In FIG. 2, the server side on the left side of the figure illustrates processing executed by the broadcast server 10, and the client side on the right side in the figure illustrates processing executed by the client apparatus 20.

The broadcast server 10 transmits a physical layer frame including content data by broadcast waves. As will be described in detail below, the physical layer frame is a unit for transmitting content data. In addition, the broadcast server 10 obtains the Precision Time Protocol (PTP) time from a PTP clock source 11 so as to include the PTP time in an arbitrary physical layer frame and transmit the PTP time.

Here, PTP is information indicating the time defined in IEEE 1588-2008. For example, an 80-bit PTP is formed with a 48-bit second field and a 32-bit nanosecond field. The following description will be a case where the PTP time (PTP Time) is used as time information provided from the broadcast server 10.

The client apparatus 20 includes an RF demodulator 101, broadcast middleware 102, a storage unit 103, a browser 104, a DASH client 105, a decoder 106, and an output unit 107.

The RF demodulator 101 is connected to an antenna that receives broadcast waves transmitted from the broadcast server 10, and extracts a physical layer frame transmitted by broadcast waves. The RF demodulator 101 extracts a PTP time from an arbitrary physical layer frame among the extracted physical layer frames and supplies the extracted PTP time to the broadcast middleware 102.

The broadcast middleware 102 obtains system time (System Time) from the system clock source 21 simultaneously (substantially simultaneously) with the extraction of the PTP time by the RF demodulator 101. Note that the system time generated by the system clock source 21 is used not merely by the broadcast middleware 102 but also by each of portions of the client apparatus 20. For example, an application 121 executed by the browser 104 can obtain system time from the system clock source 21.

The broadcast middleware 102 associates (pairs) the PTP time supplied from the RF demodulator 101 with the system time as a broadcast time (Broadcast Time), and stores resultant information (hereinafter referred to as time correspondence information) in the storage unit 103. The storage unit 103 is constituted with a semiconductor memory, for example.

Here, the broadcast time is time information provided from the content transmission side and is used for reproduction of content, for example. Meanwhile, the system time is time information generated on the content reception side and is used for displaying current time or recording log information, for example. That is, the broadcast time and the system time associated with each other as the time correspondence information can be defined as time information basically used for separate purposes.

In a case where a GetBroadcastTime request has been received from the application 121 executed by the browser 104, the broadcast middleware 102 reads out time correspondence information from the storage unit 103 and replies to the application 121 as a GetBroadcastTime response. That is, the broadcast middleware 102 has a function as a managing unit that manages time correspondence information.

An example of the browser 104 is a browser compatible with HyperText Markup Language 5 (HTML5). The browser 104 obtains and executes the application 121 distributed via broadcasting or via communication. The application 121 is an application accompanying the content delivered from the broadcast server 10, and is described in a markup language such as HTML5 and JavaScript (registered trademark), for example. Furthermore, the application 121 also functions as a player for reproducing the content distributed from the broadcast server 10. Note that the application 121 may be recorded in the client apparatus 20 beforehand.

The application 121 issues a GetBroadcastTime request to the broadcast middleware 102 at the start of reproduction of content. This enables the application 121 to obtain time correspondence information as a GetBroadcastTime response from the broadcast middleware 102.

The application 121 controls transfer of data (DASH segment) as a decoding target to enable content to be reproduced by the time axis according to the broadcast time corresponding to the system time on the basis of the time correspondence information from the broadcast middleware 102. That is, the application 121 has a function as a reproduction control unit (player) that controls reproduction of the content.

The RF demodulator 101 supplies the broadcast middleware 102 with the demodulated data obtained by demodulation processing on the physical layer frame. The broadcast middleware 102 processes demodulated data supplied from the RF demodulator 101 on the basis of signaling or the like, and supplies data obtained as a result to the DASH client 105.

The DASH client 105 processes data (DASH segment) supplied from the broadcast middleware 102. In accordance with the control from the application 121, the DASH client 105 supplies the DASH segment to the decoder 106 at an appropriate timing (suitable timing).

The decoder 106 decodes video and audio data obtained from the DASH segment supplied from the DASH client 105 in accordance with a predetermined decoding scheme. Here, for example, decoding is performed according to the decoding scheme such as High Efficiency Video Coding (HEVC) or Advanced Audio Coding (AAC). The video and audio data obtained by the decoding are supplied to the output unit 107.

The output unit 107 performs processing such as rendering on the video and audio data supplied from the decoder 106, and outputs resulting data. This allows the video and audio of the content such as a television program to be reproduced on the client apparatus 20.

As described above, the client apparatus 20 reproduces the content distributed in streaming distribution from the broadcast server 10. However, for example, the broadcast middleware 102, the browser 104, and the application 121 can be provided onto the client apparatus 20 as software, and can be implemented by execution of a predetermined program by a CPU (CPU 1001 in FIG. 22 to be described below).

Note that while there might be a delay in the transmission line 30 in transmission of the PTP time contained in the physical layer frame as the time information from the broadcast server 10 to the client apparatus 20, the amount of this delay would be constant in the client apparatus 20 existing at a certain location. Accordingly, this leads to no particular problem as long as the amount of delay at the target client apparatus 20 can maintain a constant interval.

Moreover, while the following will describe the PTP time as the time information provided from the broadcast server 10 to the client apparatus 20, the time information is not limited to the PTP time, and any time information can be used. For example, it is possible to use time information defined by Coordinated Universal Time (UTC) or the local time (LT) which is the standard time of each of time zones, the time information defined by Network Time Protocol (NTP), time information defined in Third Generation Partnership Project (3GPP), time information included in Global Positioning System (GPS) information, time information of a format decided independently, or the like.

(Data Transmission Scheme of the Present Technology)

Meanwhile, ATSC 3.0 assumes providing further advanced services by introducing an IP transmission scheme using an Internet Protocol (IP) packet used in the communication field in digital broadcasting, rather than the MPEG2-Transport Stream (TS) scheme widely used at present as a transmission scheme.

In addition, ATSC 3.0 assumes the use of Link Layer Signaling (LLS) and Service Layer Signaling (SLS) as signaling. LLS signaling is signaling obtained prior to SLS signaling. SLS signaling is obtained in accordance with information included in LLS signaling. SLS signaling is signaling provided in units of service.

LLS signaling includes metadata such as a Service List Table (SLT) and a Rating Region Table (RRT). The SLT metadata contains basic information indicating a configuration of streams and services in a broadcasting network, such as information (tuning information) necessary in tuning of the service. The RRT metadata includes information related to rating.

The SLS signaling includes metadata such as User Service Description (USD), Service-based Transport Session Instance Description (S-TSID), and Media Presentation Description (MPD). The USD metadata includes information such as the acquisition destination of other metadata. Note that USD is sometimes referred to as User Service Bundle Description (USBD).

The S-TSID metadata is an extension of LCT Session Instance Description (LSID) for ATSC 3.0 and is control information of Real-time Object Delivery over Unidirectional Transport (ROUTE) protocol. Note that ROUTE is a protocol for streaming file transfer, which is an extension of File Delivery over Unidirectional Transport (FLUTE).

MPD metadata is management information of video and audio files used for performing streaming distribution conforming to Dynamic Adaptive Streaming over HTTP (MPEG-DASH). Here, MPEG-DASH is a streaming distribution standard according to Over The Top Video (OTT-V), and is a standard related to adaptive streaming distribution using a streaming protocol based on Hypertext Transfer Protocol (HTTP).

This MPEG-DASH standard defines: a manifest file for describing metadata that is management information of video and audio files; and a file format for transmitting moving image content. Then, the former manifest file is referred to as Media Presentation Description (MPD). In addition, the latter file format is also referred to as a segment format.

Note that LLS signaling such as SLT and RRT and SLS signaling such as SLT, USD, S-TSID, and MPD can be described by markup languages such as Extensible Markup Language (XML), for example.

(Protocol Stack of the Present Technology)

Figure 3:
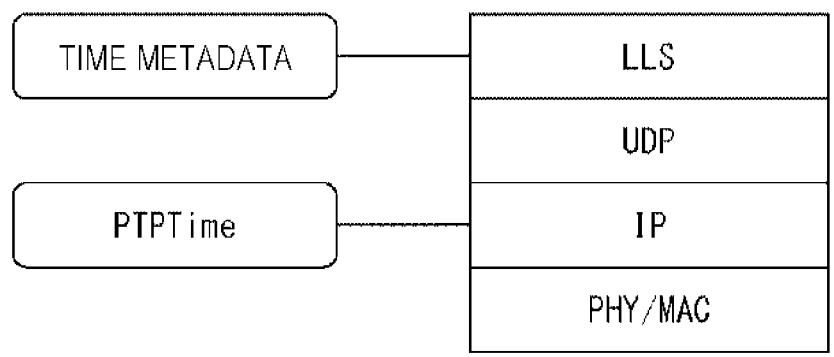
FIG. 3 is a diagram illustrating an example of a protocol stack of an IP transmission scheme of the present technology.

FIG. 3 is a diagram illustrating an example of a protocol stack of an IP transmission scheme of the present technology.

In FIG. 3, the lowest layer is a physical layer (Physical (PHY)/Media Access Control (MAC). Note that, in this example, a data link layer is described as a portion of the physical layer. In addition, an upper layer adjacent to the physical layer is an Internet Protocol (IP) layer. The IP layer is a layer corresponding to a network layer in a hierarchical model of communication, and an IP packet is identified by an IP address.

In addition, an upper layer adjacent to the IP layer is defined as a User Datagram Protocol (UDP) layer. The UDP layer is a layer corresponding to a transport layer in a hierarchical model of communication, and a UDP packet is identified by a port number. An upper layer adjacent to the UDP layer is an LLS layer that transmits LLS signaling.

In FIG. 3, the LLS signaling transmitted in the LLS layer includes time metadata in addition to tuning information or the like. This time metadata includes correction information for adjusting leap seconds and daylight saving time. The client apparatus 20 uses the correction information included in the LLS signaling to correct the time information such as the PTP time, enabling processing with time information corresponding to leap seconds or daylight saving time.

Here, the leap second is one second adjustment inserted or deleted onto the UTC on the basis of a global agreement to prevent the UTC advancing in synchronization with International Atomic Time (TAI) from drifting away from universal time (UT1) due to a change in the Earth's rotation rate over many years. For example, while leap second adjustment is needed in UTC and local time, leap second adjustment is not necessary in PTP.

Daylight saving time (DST) represents a practice of advancing standard time by one hour or the advanced time for the purpose of effectively utilizing the time zone with sunlight during summer months of a year. Note that in some areas, the difference between the daylight savings time and the normal time may be defined as 30 minutes, or the like, rather than one hour. Note that daylight saving time is also referred to as summer time.

Figure 4:
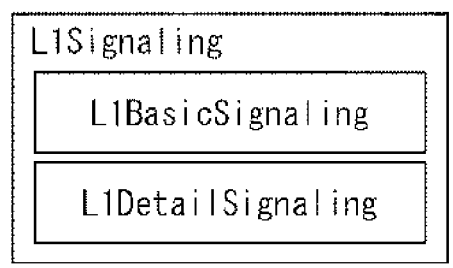
FIG. 4 is a diagram illustrating a configuration example of L1 signaling.

In addition, in FIG. 3, L1 signaling transmitted in the physical layer includes PTP time in addition to demodulation information or the like. Here, FIG. 4 illustrates a configuration example of L1 signaling. L1 signaling is included in a preamble of the physical layer frame, that is, a unit for transmitting data in the physical layer. In addition, L1 signaling includes L1 basic information (L1 Basic Signaling) and L1 detailed information (L1 Detail Signaling).

Here, the L1 basic information and the L1 detailed information can be compared with each other with different sizes, namely, the L1 basic information is constituted with about 200 bits, whereas the L1 detailed information is constituted with 400 to several thousand bits. Moreover, the L1 basic information and the L1 detailed information are read out in this order, that is, the L1 basic information is read out prior to the L1 detailed information in the preamble of the physical layer frame. Furthermore, the L1 basic information is different from the L1 detailed information in that it is transmitted more robustly.

Time information such as PTP time can be included in L1 basic information or L1 detailed information as L1 signaling.

(Structure of Physical Layer Frame)

Figure 5:
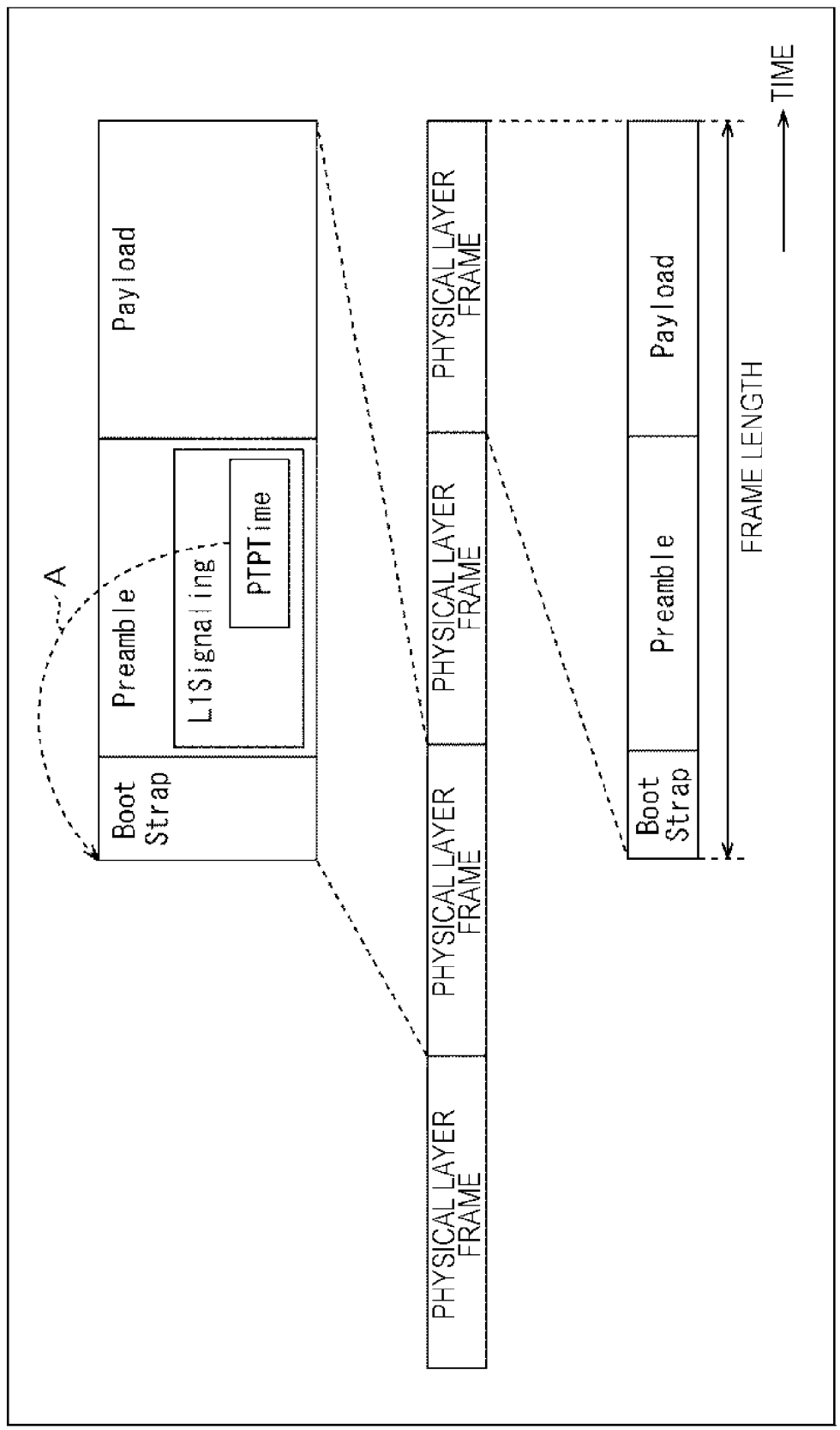
FIG. 5 is a diagram illustrating a configuration example of a physical layer frame.

FIG. 5 is a diagram illustrating a configuration example of a physical layer frame. Note that in FIG. 5, the time direction is a direction from the left side toward the right side in the figure.

In FIG. 5, the physical layer frame is constituted with a bootstrap (Bootstrap), a preamble (Preamble), and a payload (Payload). The physical layer frame is configured with a predetermined frame length such as units of milliseconds. In the physical layer frame, it is possible to obtain a subsequent payload after acquisition of the bootstrap and the preamble.

Note that the bootstrap corresponds to a P1 symbol constituting a T2 frame of Digital Video Broadcasting-Second Generation Terrestrial (DVB-T2), for example, and the preamble corresponds to a P2 symbol constituting a T2 frame of DVB-T2, for example. Therefore, the bootstrap can also be defined as a preamble.

FIG. 5 illustrates a detailed configuration of an arbitrary physical layer frame among a plurality of physical layer frames transmitted in time series. For example, the L1 signaling included in the preamble of the second physical layer frame from the top includes a PTP time. The time indicated by the PTP time represents a time at a head position (position of the head of the bootstrap) of the physical layer frame having the preamble of the L1 signaling including the PTP time, as indicated by the dotted arrow A.

That is, the time indicated by the PTP time included in the second physical layer frame from the top is the time at the head position of the second physical layer frame.

Note that, while the above is a case where the time indicated by the PTP time is the time at the head position of the physical layer frame, the time indicated by the PTP time can represent an absolute time of a predetermined position in the physical layer frame. For example, the time indicated by the PTP time can represent an arbitrary position of the physical layer frame, such as a position of a boundary between the bootstrap and preamble of the physical layer frame having the preamble including the PTP time, and a last position of the preamble.

(Configuration of L1 Basic Information)

FIG. 6 is a diagram illustrating an example of syntax of L1 basic information (L1 Basic Signaling) of FIG. 4.

Note that details of the L1 basic information are described in "Table 9.2 L1-Basic Signaling Fields and Syntax" in Non-Patent Document 1 below. Therefore, the syntax of FIG. 6 describes extracted portions related to the present technology in particular, among the L1 basic information.

Non-patent document 1: ATSC Candidate Standard: Physical Layer Protocol (A/322) Doc. 532-230r456 April 2016

2-bit L1B_content_tag represents a tag value for identifying content. 3-bit L1B_version represents a version of L1 basic information. The 1-bit L1B_slt_flag indicates whether or not a Service Labeling Table (SLT) exists.

The 2-bit L1B_time_info_flag indicates whether or not time information exists.

In a case where "00" is set as L1B_time_info_flag, it indicates that the target physical layer frame does not include time information. In a case where "01" is set as L1B_time_info_flag, it indicates that a target physical layer frame includes time information with precision of units of milliseconds.

In a case where "10" is set as L1B_time_info_flag, it indicates that a target physical layer frame contains time information with precision of units of microseconds. In a case where "11" is set as L1B_time_info_flag, it indicates that a target physical layer frame contains time information in units of nanoseconds.

(Configuration of L1 Detailed Information)

FIG. 7 is a diagram illustrating an example of syntax of L1 detailed information (L1 Detail Signaling) in FIG. 4.

Note that details of the L1 detailed information are described in "Table 9.8 L1-Detail Signaling Fields and Syntax" of Non-Patent Document 1 described above. Therefore, the syntax of FIG. 7 describes extracted portions related to the present technology in particular, among the L1 detailed information.

4-bit L1D_version represents a version of the L1 detailed information.

A parameter related to channel bonding (Channel Bonding) is arranged in a loop corresponding to 3-bit L1D_num_rf. That is, 19-bit L1D_rf_frequency represents a frequency of an RF channel bonded by channel bonding.

Here, a case where a value other than "00" is set as L1B_time_info_flag in the L1 basic information of FIG. 6 indicates that time information exists. Accordingly, a 32-bit L1D_time_sec and a 10-bit L1D_time_msec are arranged as time information in the L1 detailed information in FIG. 7. Here, L1D_time_sec represents time information in units of seconds (sec). In addition, L1D_time_msec represents time information in units of milliseconds (msec).

In addition, in a case where "10" or "11" is set as L1B_time_info_flag, 10 bits of L1D_time_usec is further arranged as time information. Here, L1D_time_usec represents time information in units of microseconds (usec).

Furthermore, in a case where "11" is set as L1B_time_info_flag, 10-bit L1D_time_nsec is further arranged as time information. Here, L1D_time_nsec represents time information in units of nanoseconds (nsec).

In this manner, in a case where "01" is set as L1B_time_info_flag, precision is in units of milliseconds, and thus, L1D_time_sec and L1D_time_msec are arranged. Moreover, in a case where "10" is set as L1B_time_info_flag, precision is in units of microseconds, and thus, L1D_time_sec, L1D_time_msec, and L1D_time_usec are arranged. Moreover, in a case where "11" is set as L1B_time_info_flag, precision is in units of nanoseconds, and thus, L1D_time_sec, L1D_time_msec, L1D_time_usec, and L1D_time_nsec are arranged.

(Configuration of LLS Table)

FIG. 8 is a diagram illustrating an example of syntax of an LLS table.

Note that details of the LLS table are described in "Table 6.1 Common Bit Stream Syntax for LLS Tables" in Non-Patent Document 2 below. Therefore, the syntax of FIG. 8 describes extracted portions related to the present technology in particular, among the LLS table.

Non-patent document 2: ATSC Candidate Standard: Signaling, Delivery, Synchronization, and Error Protection (A/331) Doc. 533-174r15 Jan. 2016

8-bit LLS_table_id represents ID of an LLS table. 8-bit provider id represents ID of a provider. 8-bit LLS_table__version represents a version of an LLS table.

In a case where "0x01" is set as LLS_table_id, SLT metadata is arranged as LLS signaling. In a case where "0x02" is set as LLS_table_id, RRT metadata is arranged as LLS signaling.

In a case where "0x03" is set as LLS_table_id, system time (SystemTime) is arranged as LLS signaling. This system time corresponds to the above-described time metadata.

(Configuration of SystemTime Element) FIG. 9 is a diagram illustrating a configuration example of a SystemTime element as time metadata. Note that, "@" is attached to attributes among elements and attributes illustrated in FIG. 9. Also note that indented elements and attributes are designated with respect to their upper elements.

A SystemTime element is an upper element of a currentUtcOffset attribute, a ptpPrepend attribute, a leap59 attribute, a leap61 attribute, a utcLocalOffset attribute, a dsStatus attribute, a dsDayOfMonth attribute, and a dsHour attribute.

An offset between PTP and UTC is set in the currentUtcOffset attribute. Upper 16 bits of PTP untransmitted in the physical layer frame are set in the ptpPrepend attribute. The information set here, however, is unnecessary in 2106 and before.

A value corresponding to a flag indicating deletion of a leap second in UTC is set in the leap59 attribute. A value corresponding to a flag indicating insertion of a leap second of UTC is set in the leap61 attribute.

A difference (time zone) between UTC and local time is set in the utcLocalOffset attribute. Daylight saving time status is set in the dsStatus attribute. Start and end dates of daylight saving time are set in the dsDayOfMonth attribute. Start and end times of daylight saving time are set in the dsHour attribute.

Note that an item "Use" in FIG. 9 surely designates only one element or attribute in a case where "1" is designated; and whether to designate the element or attribute is optional in a case where "0..1" is designated. Moreover, an item "Data Type" indicates that the value of the element or attribute is an integer type in a case where "unsigned Byte" or "unsignedshort" is designated. In a case where "boolean" is designated, this indicates that the element or attribute is Boolean. In a case where "duration" is designated, this indicates that this is a data type representing time, indicating that it is a certain period.

<3. Time Information Processed by Client Apparatus>

(Processing Flow of Broadcast Middleware)

Figure 10:
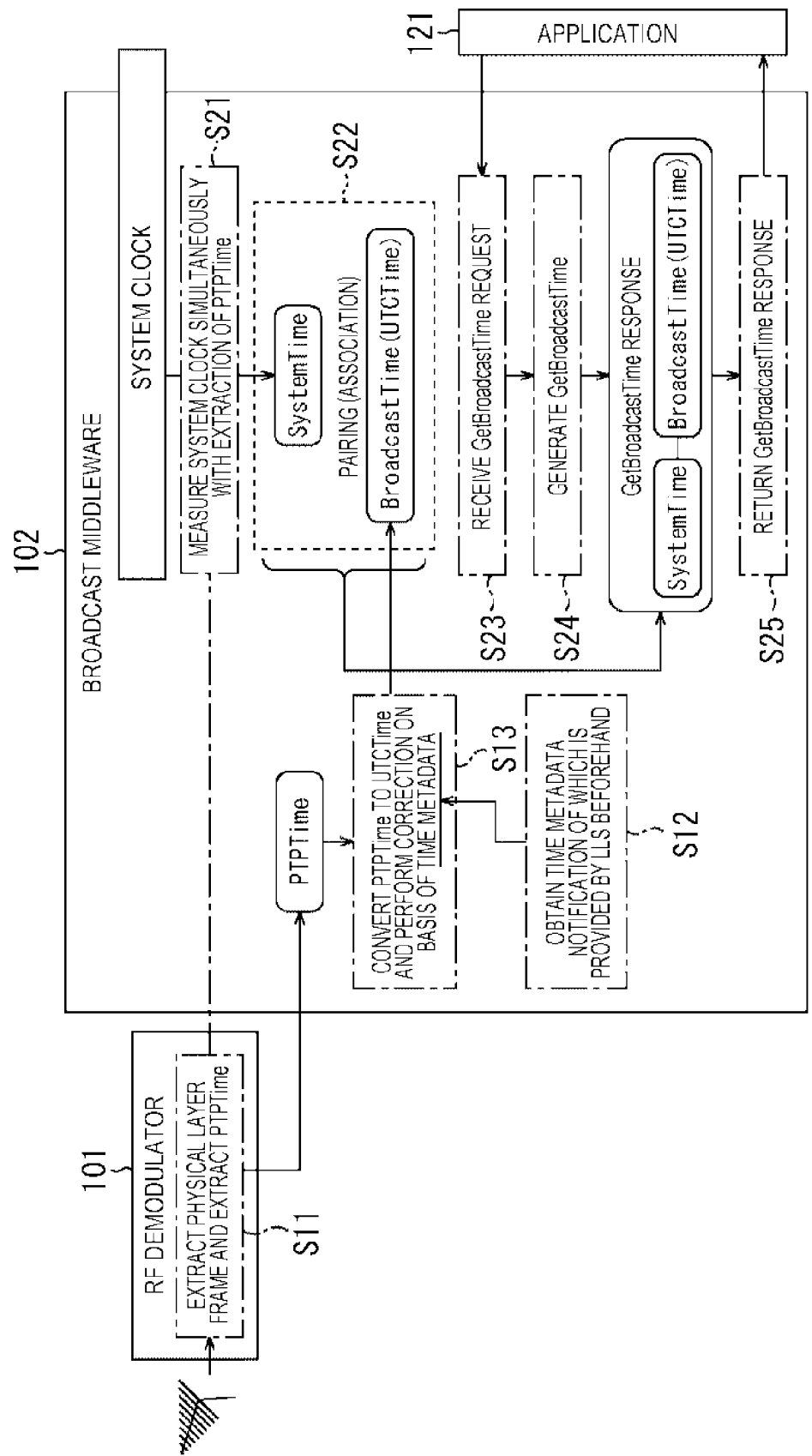
FIG. 10 is a diagram illustrating a flow of processing executed by an RF demodulator and broadcast middleware.

FIG. 10 is a diagram illustrating a flow of processing executed by the RF demodulator 101 and the broadcast middleware 102.

In FIG. 10, the RF demodulator 101 extracts a physical layer frame from broadcast waves received by the antenna and extracts PTP time from L1 signaling of its preamble (S11). Note that the PTP time is included in an arbitrary physical layer frame.

The PTP time is supplied from the RF demodulator 101 to the broadcast middleware 102. In addition, the broadcast middleware 102 obtains and stores time metadata transmitted as LLS signaling beforehand, and thus obtains the time metadata (S12).

The broadcast middleware 102 converts the PTP time supplied from the RF demodulator 101 to UTC time (S13). In addition, the broadcast middleware 102 corrects (S13) the PTP time before conversion or the UTC time after conversion on the basis of the time metadata obtained in the processing of step S12. The UTC time corrected in this manner is defined as the broadcast time.

Meanwhile, the broadcast middleware 102 measures the system clock and obtains the system time (S21) simultaneously (substantially simultaneously) with the extraction of the PTP time from the physical layer frame performed in the processing of step S1. Note that the timing of acquisition of the system time is not limited to the simultaneous time with the time information extraction by the RF demodulator 101 and may be at other timing.

For example, while an output from the RF demodulator 101 configured as a demodulation LSI is input to a system-on-a-chip (SoC) having a function of a demultiplexer, the system time may be measured at the timing of transfer of time information stored in a Media Access Control (MAC) frame such as an ATSC Link-layer Protocol (ALP) packet to the system-on-a-chip. Note that the ALP packet is a layer-2 packet that stores an IP packet including a UDP packet.

The broadcast middleware 102 pairs the broadcast time (UTC time) obtained in the processing of step S13 and the system time obtained in the processing of step S21, and stores resulting time correspondence information in the storage unit 103 (S22).

The timing of storing the time correspondence information can be, for example, the timing of extraction of the PTP time from the physical layer frame, such as an interval of one to five seconds, so as to allow the pairing with the system time for each of the extracted PTP times to be stored as the time correspondence information. Alternatively, however, the timing of storing the time correspondence information can be changed, for example, in accordance with operation, such as units of hours or a whole day. Moreover, the storage unit 103 basically overwrites the time correspondence information and saves latest time correspondence information alone.

Thereafter, in a case where a GetBroadcastTime request has been received from the application 121, the broadcast middleware 102 generates a GetBroadcastTime response corresponding to the request (S23 and S24). The GetBroadcastTime response generated here includes the time correspondence information generated in the processing of step S22 and read out from the storage unit 103.

The broadcast middleware 102 replies with the GetBroadcastTime response generated in the processing of step S24 to the application 121 (S25).

The flow of processing executed by the RF demodulator 101 and the broadcast middleware 102 has been described above.

(Process Flow of Application)

Figure 11:
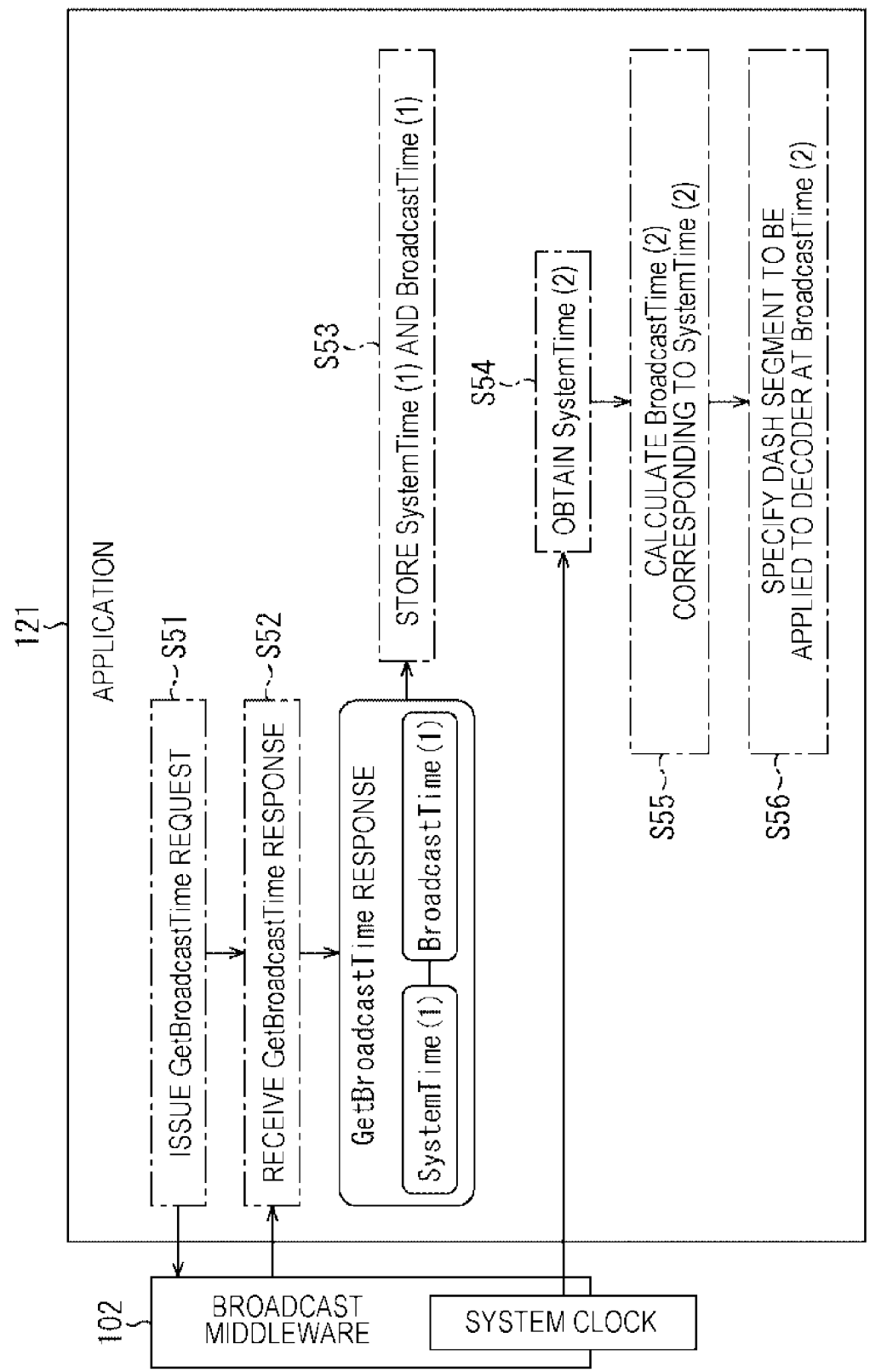
FIG. 11 is a diagram illustrating a flow of processing executed by an application.

FIG. 11 is a diagram illustrating a flow of processing executed by the application 121.

In FIG. 11, the application 121 issues a GetBroadcastTime request to the broadcast middleware 102 at the time of starting reproduction of the content (S51) When this GetBroadcastTime request has been issued, the broadcast middleware 102 executes steps S23 to S25 (FIG. 10) and replies with a GetBroadcastTime response.

The application 121 receives the GetBroadcastTime response as a reply from the broadcast middleware 102 (S52). The GetBroadcastTime response includes information obtained by pairing the broadcast time and the system time as the time correspondence information.

Here, for convenience of description, the broadcast time and the system time included in the time correspondence information will be referred to as BroadcastTime(1) and SystemTime(1), respectively. That is, BroadcastTime(1) and SystemTime(1) can also be defined as a pair of broadcast time and system time at a certain point in the past. The application 121 temporarily stores (holds) BroadcastTime(1) and SystemTime(1) (S53).

The application 121 executes a Date( ) function and thereby obtains SystemTime(2) as the system time at that point (S54). Note that the Date( ) function is provided as an Application Program Interface (API) of JavaScript (registered trademark), for example.

The application 121 calculates (S55) BroadcastTime(2) as the broadcast time that corresponds to SystemTime(2) on the basis of BroadcastTime(1) and SystemTime(1) temporarily stored (held) in the processing of step S53 and SystemTime(2) obtained in the processing of step S54. That is, BroadcastTime(2) can also be defined as the broadcast time at that point corresponding to the system time at that point. Note that details of a method of calculating BroadcastTime(2) will be described below with reference to FIG. 12.

The application 121 specifies (S56) a DASH segment to be processed by the decoder 106 at the time indicated by BroadcastTime(2) calculated in the processing of step S55. This allows the DASH segment to be transferred from the DASH client 105 to the decoder 106 at an appropriate timing, and the content is reproduced. Note that details of the method of specifying the DASH segment will be described below with reference to FIG. 13.

The flow of processing executed by the application 121 has been described above.

(Broadcast Time Calculation Method)

Figure 12:
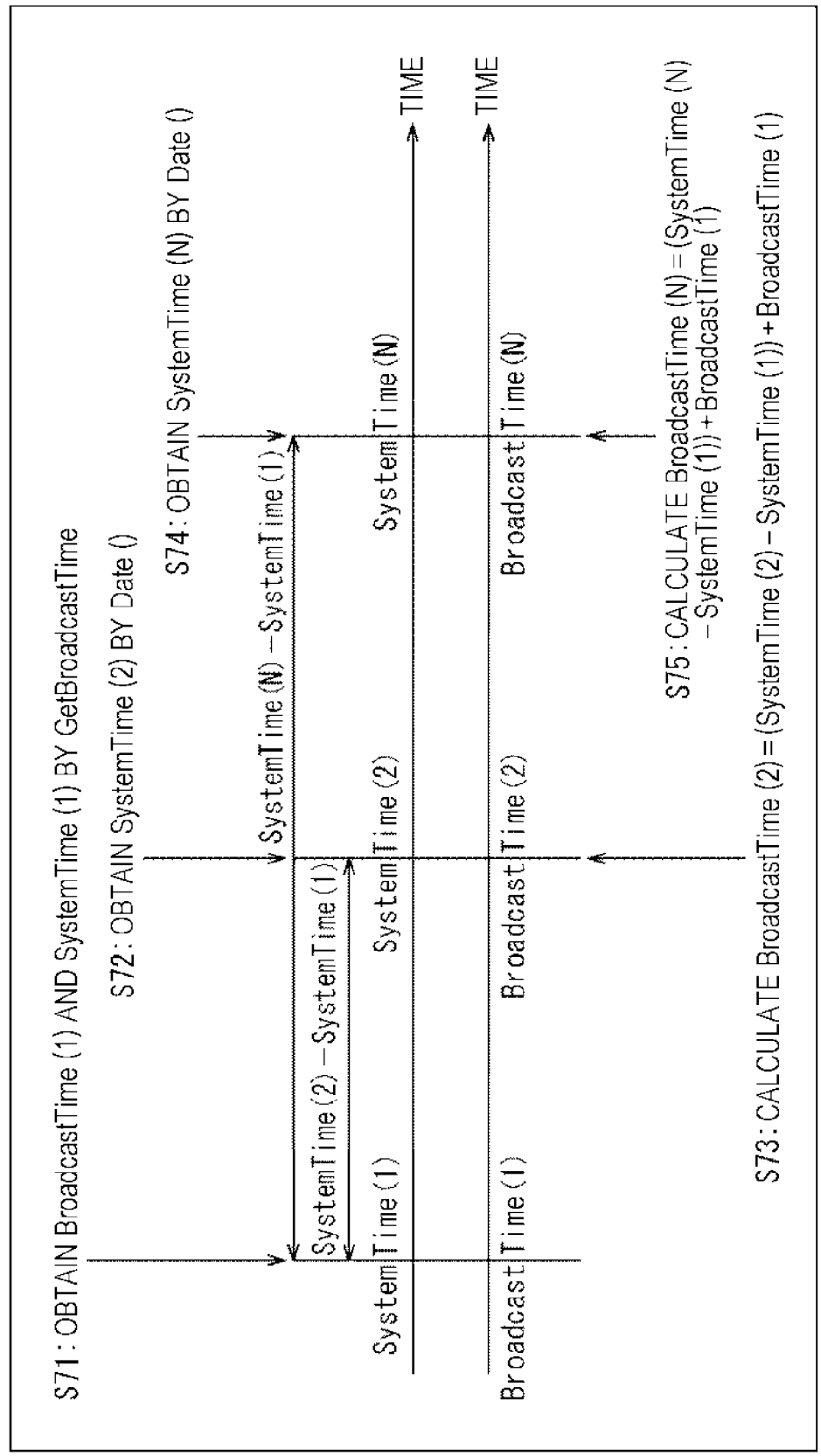
FIG. 12 is a diagram illustrating a method of calculating a broadcast time.

FIG. 12 is a diagram illustrating a method of calculating the broadcast time in the processing of step S55 in FIG. 11.

In step S71, the application 121 issues a GetBroadcastTime request to the broadcast middleware 102, so as to obtain time correspondence information. Here, information associating BroadcastTime(1) with SystemTime(1) at a certain point in the past is obtained as the time correspondence information.

In step S72, the application 121 executes the Date( ) function to obtain SystemTime(2).

In step S73, using the time information obtained in the processing in steps S71 and S72, the application 121 computes the following Formula (1) to calculate BroadcastTime(2). With this calculation, the application 121 can obtain the BroadcastTime(2) corresponding to the SystemTime(2) as the broadcast time corresponding to the system time at that point.

$$\text{BroadcastTime}(2) = (\text{SystemTime}(2) - \text{SystemTime}(1)) + \text{BroadcastTime}(1) \qquad (1)$$

Similarly thereafter, the application 121 obtains SystemTime(N) by the Date( ) function at an arbitrary timing (S74), allowing the following Formula (2) to be computed to calculate BroadcastTime(N) (S75).

$$\text{BroadcastTime}(N) = (\text{SystemTime}(N) - \text{SystemTime}(1)) + \text{BroadcastTime}(1) \qquad (2)$$

(Method for Specifying DASH Segment)

Figure 13:
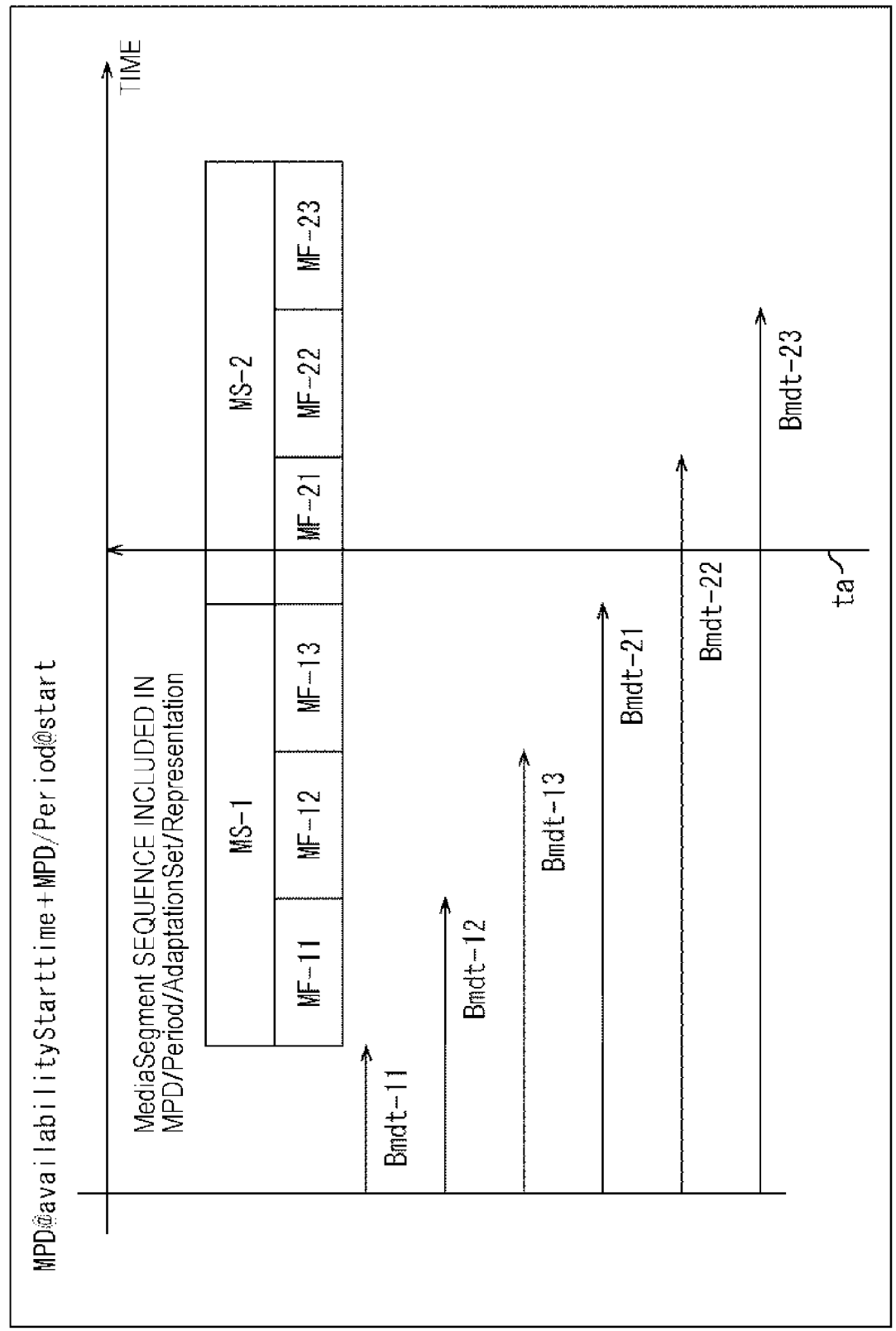
FIG. 13 is a diagram illustrating a method for specifying a DASH segment.

FIG. 13 is a diagram illustrating a method of specifying a DASH segment in the processing of step S56 in FIG. 11.

The application 121 specifies a movie fragment (Movie Fragment (MF)) of the DASH segment needed to be prepared beforehand at a broadcast time indicated by BroadcastTime(2) by MPD metadata on the basis of the BroadcastTime(2) calculated by the above-described broadcast time calculation method (for example, Formula (1)). That is, the movie fragment specified here is a movie fragment of the DASH segment which should be prepared so as to be able to be delivered to the decoder 106 of the subsequent stage at an appropriate timing.

Here, in the MPD metadata, a start time of streaming distribution according to the UTC time is designated as an availabilityStartTime attribute of an MPD element as a root element. In addition, for the MPD metadata, Period (1), Period (2) . . . are designated as Period elements, and for these Period (period) elements, the start time of each of Periods (periods) is designated as a start attribute.

That is, as illustrated in FIG. 13, the MPD metadata indicates head time of each of the Periods by a sum of the start time (time on the wall clock time axis) designated by availabilityStartTime attribute and the time (time on the MPD time axis) designated on the Period element.

In addition, the MPD metadata includes the Period element, an AdaptationSet element, and a Representation element described in a hierarchical structure. The Period element is a unit that describes the configuration of content such as a television program. The AdaptationSet element or the Representation element can be used for each of streams of video, audio, subtitle, or the like, to describe attributes of each of the streams.

Specifically, the AdaptationSet element represents a stream encoded from various sources. Then, in order to allow the client apparatus 20 side to select the stream, for example in accordance with a parametric such as bit rate, the Representation element is arranged within the AdaptationSet element so as to enumerate the streams to be a plurality of options having different parameters such as the bit rate, for example. Normally, each of the AdaptationSet element and the Representation element corresponds to a single stream such as video, audio, and subtitle streams.

Moreover, in a case where ROUTE is used as a transport protocol, it is assumed that the MP4 file format is used as a streaming file format. The MP4 file format is a derivative format of an ISO base media file format (ISO Base Media File Format) defined by ISO/IEC 14496-12. The ISO base media file format has a tree structure referred to as a box (Box).

A segment transmitted in a ROUTE session includes an initialization segment (Initialization Segment (IS)) and a media segment (Media Segment (MS)). The initialization segment includes initialization information such as a data compression scheme. Furthermore, the media segment stores stream data of video, audio, subtitles, or the like. Note that this media segment corresponds to the above-described DASH segment.

In FIG. 13, each of media segments (MS) is constituted with a plurality of movie fragments (Movie Fragments (MF)). For example, a media segment MS-1 is constituted with movie fragments MF-11, MF-12, and MF-13. Furthermore, for example, the media segment MS-2 is constituted with Movie fragments MF-21, MF-22, and MF-23.

A Moof header of each of the movie fragments includes description of Base Media Decode Time (Bmdt). Bmdt represents a decoding start time of a sample.

For example, in the media segment MS-1, Bmdt-11 is described in the Moof header of the movie fragment MF-11. Similarly, Bmdt-12 is described in the Moof header of the movie fragment MF-12, and Bmdt-13 is described in the movie fragment MF-13 in its Moof header.

Moreover, in the media segment MS-2, Bmdt-21 is described in the Moof header of the movie fragment MF-21. Similarly, Bmdt-22 is described in the Moof header of the movie fragment MF-22, and Bmdt-23 is described in the movie fragment MF-23 in its Moof header.

Here, in a case where the time indicated by Broadcast-Time(2) calculated in the processing of the above-described step S73 (FIG. 12) is a time ta on the time axis of FIG. 13, the application 121 defines the Movie fragment MF-22 as a next rendering target. Then, the application 121 controls the movie fragment MF-22 of the media segment MS-2 to be reproduced (output) at the time (hereinafter, referred to as MF-22 presentation time) obtained by a sum (MPD@availabilityStartTime+MPD/Period@start+Bmdt-22) of the time designated by the availabilityStartTime attribute, the time designated by the start attribute of the Period element, and the time indicated by Bmdt-22 of the move fragment MF-22.

Specifically, the application 121 causes the movie fragment MF-22 of the media segment MS-2 to be passed on (transferred) from the DASH client 105 to the decoder 106 at an appropriate timing so as to reproduce the movie fragment MF-22 of the media segment MS-2 at the MF-22 presentation time.

That is, at the point when BroadcastTime(2)=SystemTime(2), the application 121 causes the movie fragment MF-22 to be passed on to the decoder 106 so as to enable the movie fragment MF-22 of the media segment MS-2 to be reproduced (output) at the system time (MF-22 presentation time) obtained by computing the following formula (3).

$$\text{SystemTime(MF-22 presentation time)}=(\text{MF-22 presentation time}-\text{BroadcastTime(2)})+\text{SystemTime(2)} \quad (3)$$

Note that while this example is a case where BroadcastTime(2) is calculated as the broadcast time, for example, it is possible, by processing similarly for portions subsequent to BroadcastTime(2), to specify, in the MPD metadata, a movie fragment of the DASH segment (media segment) to be prepared beforehand at the broadcast time indicated by the BroadcastTime(N) and to pass the movie fragment to the decoder 106 at an appropriate timing.

In addition, while this example is a case where the movie fragment MF-22 of the media segment MS-2 is specified as the method for specifying the DASH segment, the other movie fragments (MF) are also specified in a similar manner and passed on to the decoder 106 of the subsequent stage at an appropriate timing.

<4. Messaging Between Applications and Broadcast Middleware>

Figure 14:
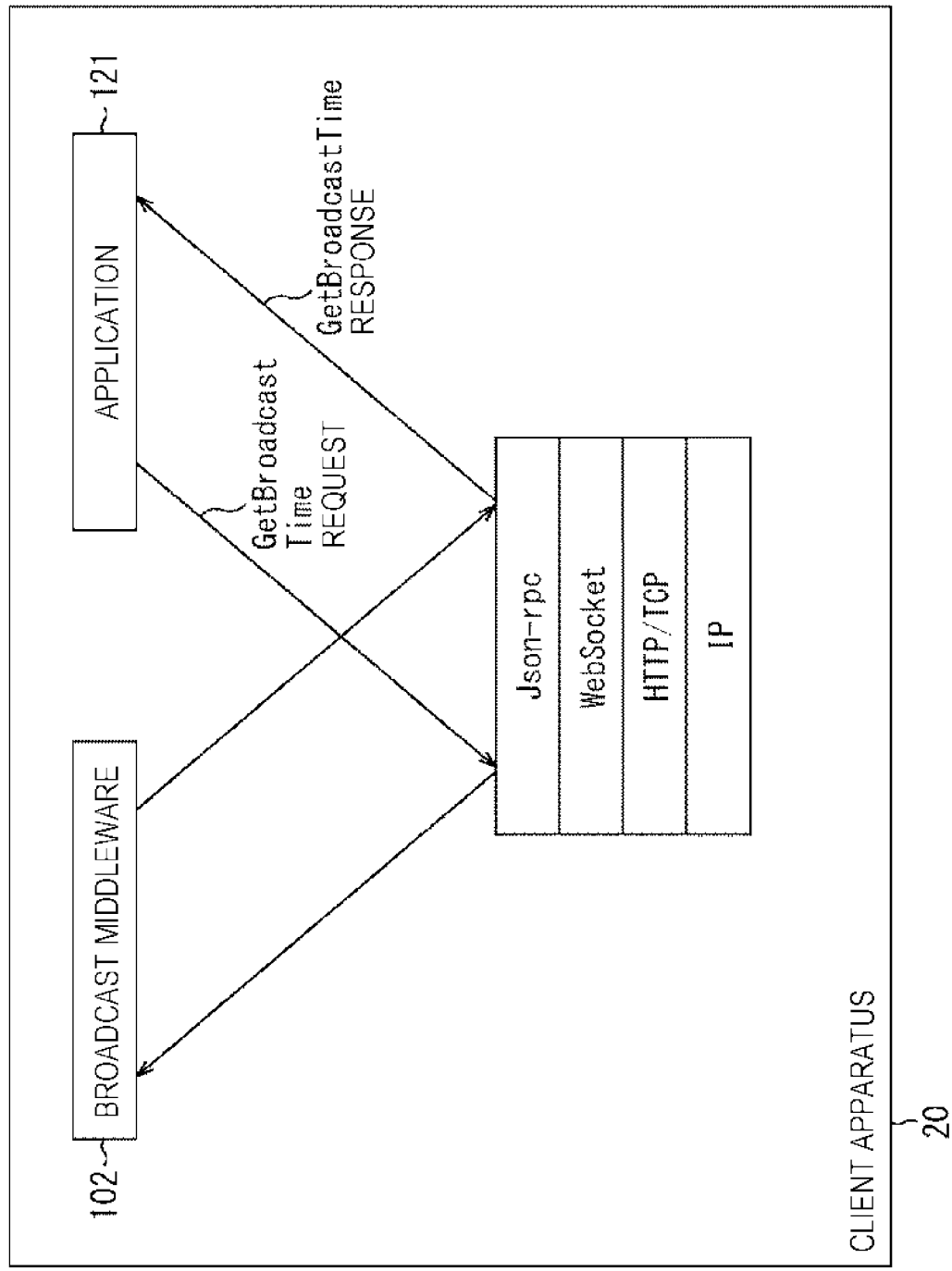
FIG. 14 is a diagram illustrating messaging between an application and a broadcast middleware.

FIG. 14 is a diagram illustrating messaging between the application 121 and the broadcast middleware 102.

As described above, the application 121 can exchange the GetBroadcastTime request and the GetBroadcastTime response with the broadcast middleware 102 to obtain the time correspondence information. This exchange of GetBroadcastTime request and GetBroadcastTime response can be implemented, for example, by combining Web socket and JSON-RPC.

Web socket (WebSocket) is a standard of communication between a web server and a browser, which has been formulated by the World Wide Web Consortium (W3C) and the Internet Engineering Task Force (IETF). JSON-RPC is a protocol for performing Remote Procedure Call (RPC) in the JavaScript (registered trademark) Object Notation (JSON) format as one type of text format.

In FIG. 14, the client apparatus 20 includes a web socket server provided as software. When a connection is established between the application 121 and the broadcast middleware 102 via the web socket server, the application 121 and the broadcast middleware 102 can exchange messages using JSON-RPC.

Here, as illustrated in a protocol stack of FIG. 14, a layer of the web socket is conceptually higher than an IP layer and an HTTP/TCP layer. Furthermore, the layer of JSON-RPC is higher than the layer of the web socket. In addition, this protocol allows the application 121 and the broadcast middleware 102 to exchange the GetBroadcastTime request and the GetBroadcastTime response.

Note that while the above description is an example of a case where a combination of a web socket and JSON-RPC is used as a messaging protocol between the application 121 and the broadcast middleware 102, other protocols may be used. Alternatively, messages may be exchanged using an Application Programming Interface (API) or the like implemented in the browser 104 that executes the application 121. In short, it is only required to enable exchanging messages between the application 121 and the broadcast middleware 102, and it is allowable to use any method for the implementation.

(GetBroadcastTime Request)

FIG. 15 is a diagram illustrating an example of the definition of the GetBroadcastTime request.

In this, method, params are defined by JSON-RPC.

A name of the method to be invoked is set in the method. In a case of the GetBroadcastTime request, description of "org.atsc.query.broadcastTime" makes it possible to identify that the request type is a GetBroadcastTime request.

An argument (parameter) of the method is set in the params. In the case of GetBroadcastTime request, there is no particular need to set parameters.

FIG. 16 is a diagram illustrating an example of a message of the GetBroadcastTime request. This message is described in JSON format. An object in JSON format can be represented by forming a key-value pair with a colon (:), enumerating zero or more the pairs with a comma (,) and enclosing the enumerated pairs in curly brackets ({ }).

In the message of FIG. 16, a value of "2.0" indicating its version is set for the key "jsonrpc". That is, the broadcast middleware 102 refers to this value and determines whether to process it as a request conforming to JSON-RPC 2.0.

"org.atsc.query.broadcastTime" is set for the key "method". That is, the broadcast middleware 102 can determine that the request type is a GetBroadcastTime request with reference to this value.

"37" is set for the key "id". This id is identification information for achieving correspondence of the response to the request. That is, in a case where a GetBroadcastTime request with an id "37" has been received, the broadcast middleware 102 is to set "37", as the same id as the request, to the GetBroadcastTime response as a reply.

(GetBroadcastTime Response)

FIG. 17 is a diagram illustrating an example of the definition of the GetBroadcastTime response.

In this, result is defined by JSON-RPC.

A return value of the method is set to the result. In the case of GetBroadcastTime response, an object of JSON format is set. In this object, a value of the broadcast time is set for the key "broadcastTime" as the property, and a value of the system time is set for the key as "systemTime". Note that the data type of the broadcast time and system time is a string type (string).

Moreover, "broadcastTime" and "systemTime" are set in "required", which means that it is necessary to set both the broadcast time and the system time. That is, it is not permitted to set only one of the broadcast time and the system time.

That is, a pair of the broadcast time and the system time set by these "broadcastTime" and "systemTime" corresponds to the time correspondence information described above. Note that while a pair of the broadcast time and the system time is defined here, for example, it is also allowable to set information of another format, such as difference information indicating a difference in time between the broadcast time and the system time.

Note that in FIG. 17 the broadcast time is defined as the wall clock time included in the broadcast stream, and the system time is defined as the time when the broadcast time is extracted.

FIG. 18 is a diagram illustrating an example of a message of GetBroadcastTime response.

In the message of FIG. 18, a value "2.0" indicating a version is set for a key "jsonrpc". That is, this indicates that the broadcast middleware 102 has executed processing as a request conforming to JSON-RPC 2.0.

"broadcastTime" and "systemTime" are set for the key "result". "Thu Apr. 28, 2016 10:31:14 GMT+0900" is set for the key "broadcastTime". Further, "Thu Apr. 28, 2016 10:31:28 GMT+0900" is set for the key "systemTime".

That is, the broadcast time is set to 10:31:14 Thursday, Apr. 28, 2016, and the system time is set to 10:31:28 Thursday Apr. 28, 2016. The set of times corresponds to the above-described time correspondence information as described above. Moreover, this example has a difference between the broadcast time and the system time of 14 seconds, and this difference information of 14 seconds may be used as the time correspondence information.

"37" is set for the key "id". That is, the broadcast middleware 102 has set "37", which is the same id as the message id of the GetBroadcastTime request received from the application 121, for the message id of the GetBroadcastTime response as a reply to the request.

<5. Flow of Processing Executed by Client Apparatus>

Figure 20:
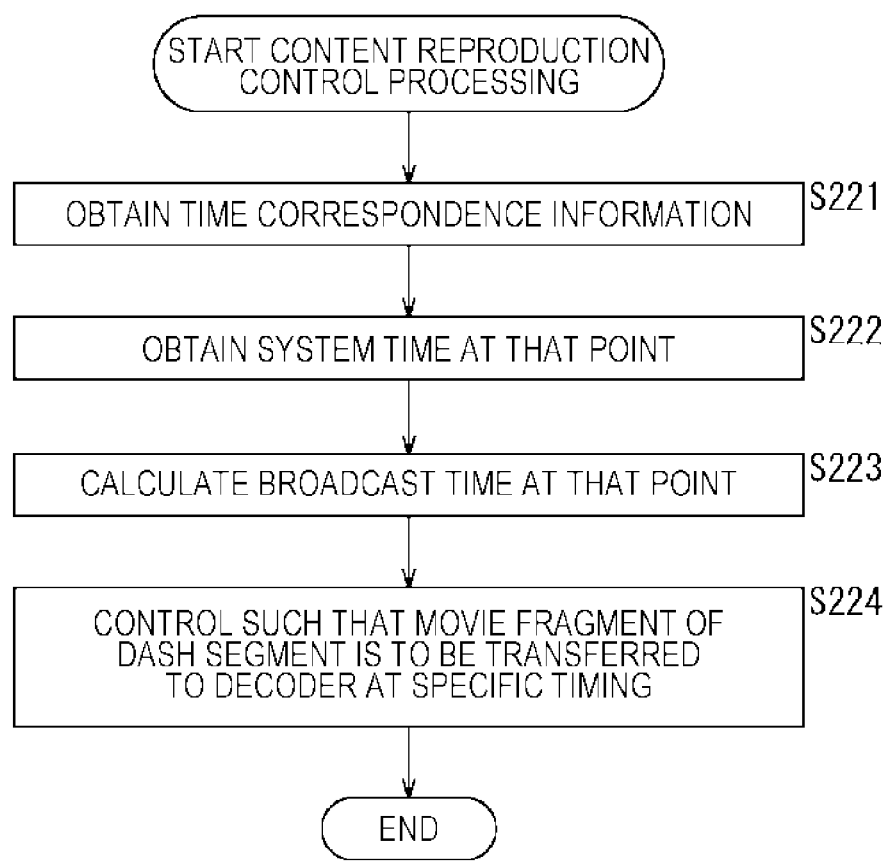
FIG. 20 is a flowchart illustrating a flow of content reproduction control processing.
Figure 21:
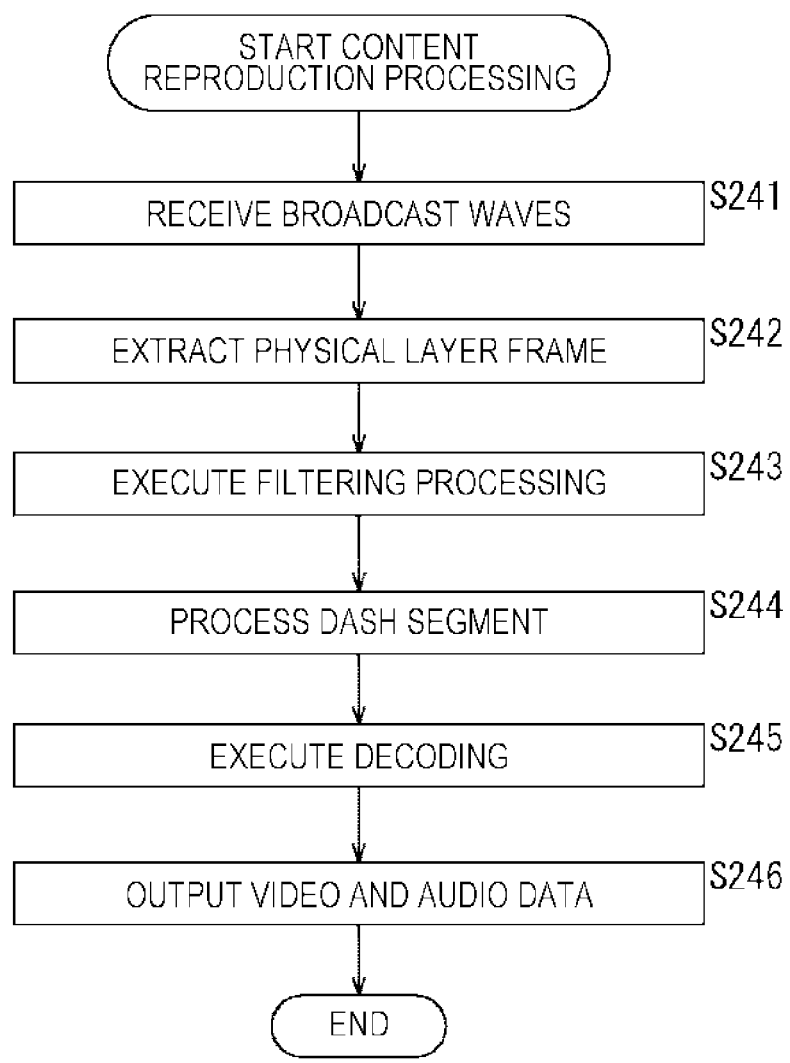
FIG. 21 is a flowchart illustrating a flow of content reproduction processing.

Next, a flow of processing to be executed by the client apparatus 20 will be described with reference to the flowcharts in FIGS. 19 to 21.

(Time Correspondence Information Management Processing)

First, a flow of time correspondence information management processing to be executed by the client apparatus 20 will be described with reference to the flowchart in FIG. 19.

In step S201, the RF demodulator 101 receives broadcast waves transmitted from the broadcast server 10 via an antenna.

In step S202, the RF demodulator 101 extracts a physical layer frame from the broadcast waves received in the processing of step S201.

In step S203, the RF demodulator 101 extracts a PTP time from an arbitrary physical layer frame among the physical layer frames extracted in step S202.

In step S204, the broadcast middleware 102 obtains the system time from the system clock resource 21 simultaneously (substantially simultaneously) with extraction of the PTP time in the processing of step S203.

In step S205, the broadcast middleware 102 associates the PTP time obtained in step S203 with the system time obtained in step S204 as the broadcast time, thereby generating time correspondence information.

In step S206, the broadcast middleware 102 stores the time correspondence information generated in the processing of step S205 in the storage unit 103.

The flow of the time correspondence information management processing has been described above. In this time correspondence information management processing, time correspondence information is generated from broadcast time and system time simultaneously (substantially simultaneously) obtained, and stored in the storage unit 103.

(Content Reproduction Control Processing)

Next, a flow of content reproduction control processing will be described with reference to the flowchart of FIG. 20.

In step S221, the application 121 obtains time correspondence information from the broadcast middleware 102. Here, the application 121 issues a GetBroadcastTime request to the broadcast middleware 102 and receives a GetBroadcastTime response as a reply, leading to acquisition of the time correspondence information.

Note that the time correspondence information obtained in the processing of step S221 is information generated by the broadcast middleware 102 in the time correspondence information management processing (FIG. 19) described above.

In step S222, the application 121 obtains the system time at that point. Here, the application 121 can obtain the system time (SystemTime(2)) at that point by executing the Date( ) function.

In step S223, the application 121 calculates the broadcast time at that point on the basis of the time correspondence information obtained in the processing of step S221 and the system time at that point obtained in the processing of step S222.

Here, the broadcast time (BroadcastTime(1)) and the system time (SystemTime(1)) at a certain point in the past are associated with each other in the time correspondence information. Accordingly, with computation of Formula (1) above incorporating the system time at that point (SystemTime(2)) would enable acquisition of the broadcast time (BroadcastTime(2)) at that point.

In step S224, the application 121 causes the movie fragment of a specific DASH segment (media segment) to be transferred to the decoder 106 at a specific timing according to the broadcast time (BroadcastTime(2)) obtained in the processing of step S223.

The flow of the content reproduction control processing has been described above. In this content reproduction control processing, the application 121 controls the movie fragment of the DASH segment (media segment) to be transferred to the decoder 106, so as to control reproduction of the content streaming distributed in streaming distribution from the broadcast server 10.

(Content Reproduction Processing)

Finally, a flow of content reproduction processing will be described with reference to the flowchart of FIG. 21.

Figure 19:
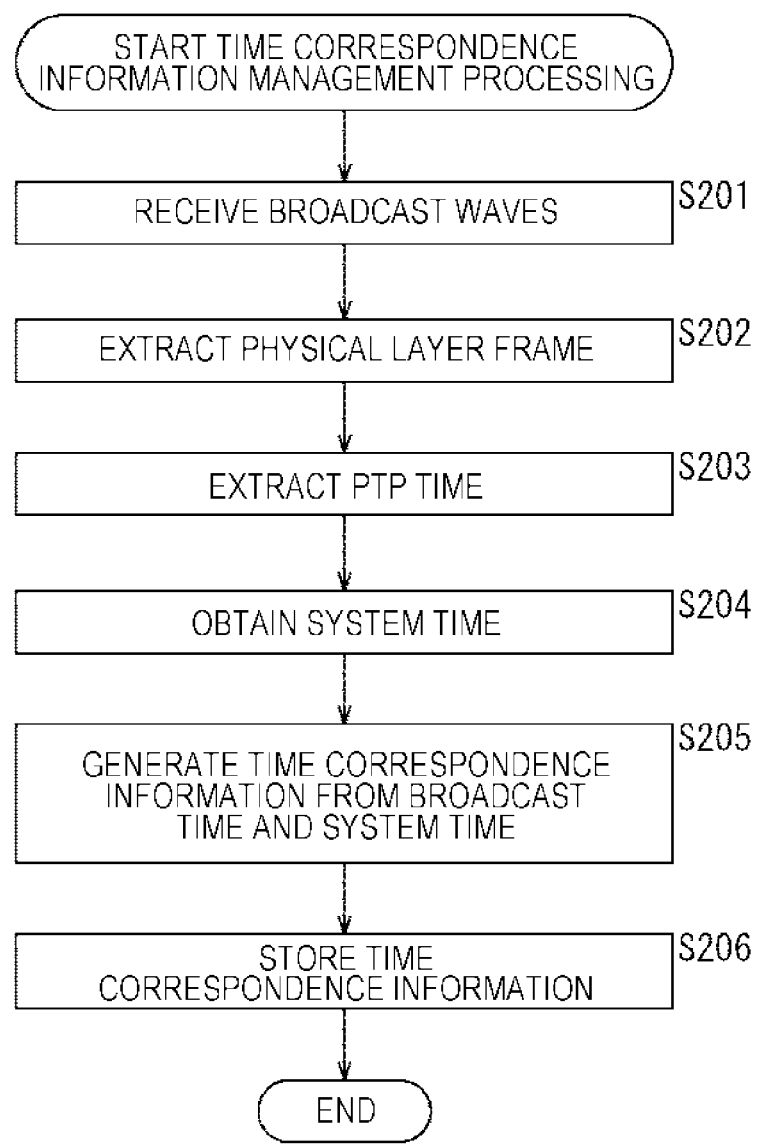
FIG. 19 is a flowchart illustrating a flow of time correspondence information management processing.

In steps S241 through S242, the RF demodulator 101 extracts a physical layer frame from broadcast waves received, similarly to the processing in steps S201 through 202 in FIG. 19.

In step S243, the broadcast middleware 102 performs filtering processing. In this filtering processing, IP packets and UDP packets are extracted from the demodulated data obtained by demodulation processing on the physical layer frame and the DASH segments transmitted in the ROUTE session are extracted on the basis of LLS signaling and SLS signaling.

In step S244, the DASH client 105 processes the DASH segment obtained in the processing of step S243. Note that the DASH client 105 allows the movie fragment of the DASH segment (media segment) to be passed on to the decoder 106 at an appropriate timing in accordance with control by the application 121 (processing of step S224 in FIG. 20).

In step S245, the decoder 106 decodes the video and audio data obtained from the DASH segment transferred at an appropriate timing in the processing of step S244.

In step S246, the output unit 107 performs rendering on the video and audio data decoded in step S245, and outputs the resulting data.

The flow of content reproduction processing has been described above. In this content reproduction processing, content distributed by streaming distribution from the broadcast server 10 is reproduced in accordance with the content reproduction control processing (FIG. 20) by the application 121.

With this configuration, the client apparatus 20 can reliably reproduce the content distributed in streaming distribution from the broadcast server 10 even when the client apparatus 20 cannot easily change the system time from the application 121, for example in a case where it is difficult to achieve synchronization of the time information between the broadcast server 10 and the client apparatus 20 (specifically, the application 121 thereof).

Note that while the above description is an example of content reproduction control as the synchronization control using the time correspondence information, it is possible to perform correct presentation control intended by the broadcasting station side by applying the synchronous control using the above time correspondence information in a case where an event that needs time synchronization is notified as an event to be processed by the application 121, for example.

<6. Modification>

While the above description is an example using ATSC (in particular, ATSC 3.0), which is a system adopted in the United States and other countries, as a standard for digital broadcasting, the present technology may be applied to Integrated Services Digital Broadcasting (ISDB) adopted by Japan and other countries, or Digital Video Broadcasting (DVB) adopted by European countries and other countries, or the like. Moreover, while the above description in an example of ATSC 3.0 adopting the IP transmission scheme, the present technology is not limited to the IP transmission scheme and may be applied to other methods such as the MPEG2 Transport Stream (MPEG2-TS) method.

Furthermore, the present technology can be applied to standards of digital broadcasting represented by terrestrial broadcast, and other standards such as satellite broadcasting using a broadcast satellite (BS) and a communication satellite (CS), and cable broadcast such as cable television (CATV).

Furthermore, the above names of signaling, packets, or the like are merely examples, and other names may be used in some cases. The difference between these names, however, is just a difference in formality, and there is no substantial difference in the signaling, packets, or the like, as a target. For example, an ATSC Link-layer Protocol (ALP) packet may be referred to as a Generic packet or the like in some cases.

Furthermore, the application is not limited to applications developed in markup languages such as HTML5 and script languages such as JavaScript (registered trademark), and may be applications developed in a programming language, such as Java (registered trademark), for example. Furthermore, the application is not limited to the application executed by browsers, and may be executed under an operating system (OS) environment (presentation control environment) or the like, as a so-called native application.

In addition, the present technology is also applicable to, for example, a predetermined standard (standards other than standards for digital broadcasting) and the like prescribed on the assumption of using, as a transmission line, a transmission line other than the broadcasting network, that is, a communication line (communication network) such as the Internet and a telephone network, or the like. In that case, a communication line such as the Internet or a telephone network is used as the transmission line 30 of the transmission system 1 (FIG. 1), and the broadcast server 10 can be used as a communication server provided on the Internet. Then, the communication server and the client apparatus 20 perform bidirectional communication via the transmission line 30 (communication line).

<7. Computer Configuration>

Figure 22:
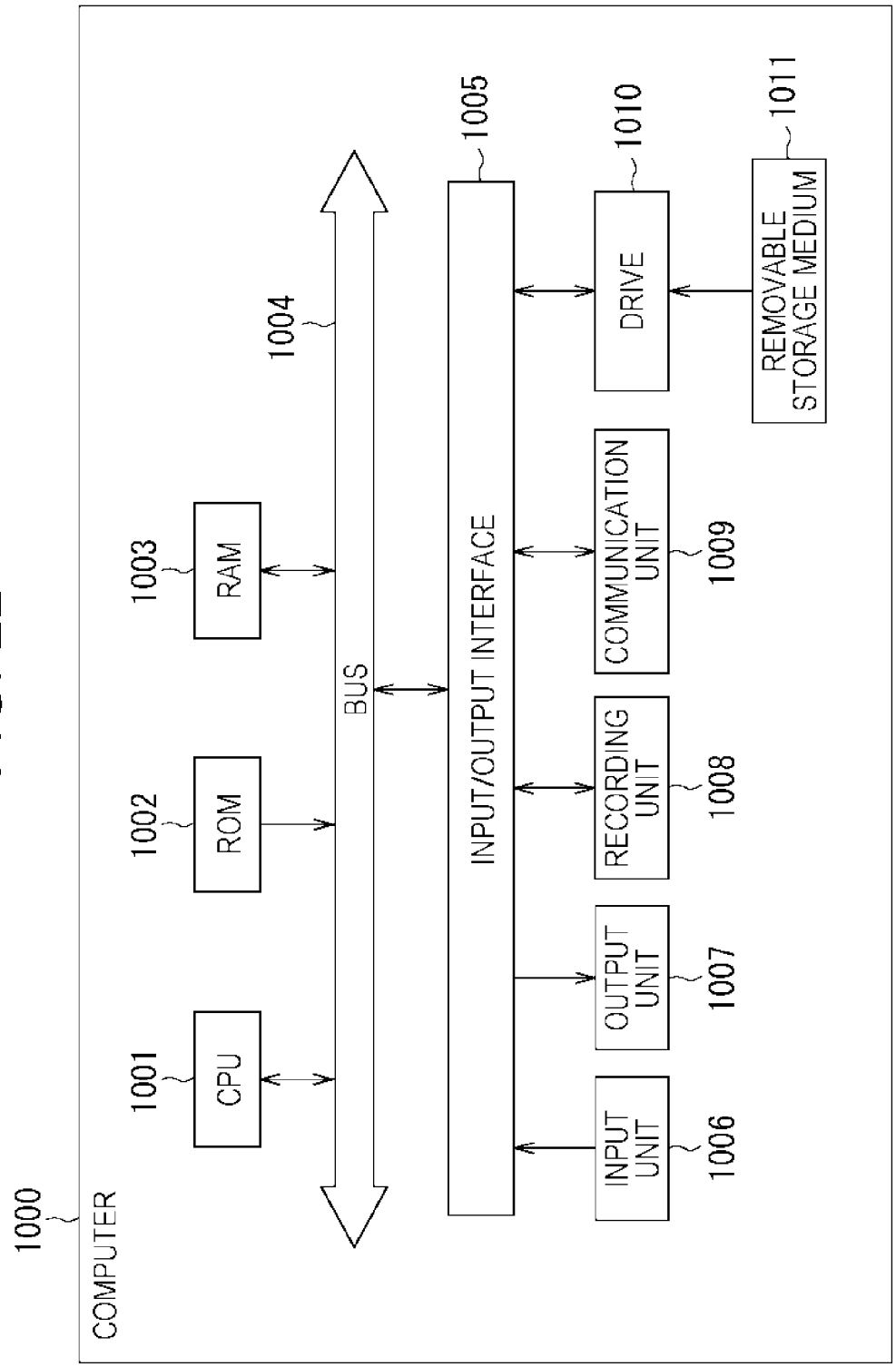
FIG. 22 is a diagram illustrating a configuration example of a computer.

A series of processing described above can be executed in hardware or with software. In a case where the series of processing is executed with software, a program included in the software is installed in a computer. FIG. 22 is a diagram illustrating an exemplary configuration of hardware of a computer that executes the series of processing described above by a program.

In a computer 1000, a central processing unit (CPU) 1001, a read only memory (ROM) 1002, a random access memory (RAM) 1003 are interconnected with each other via a bus 1004. The bus 1004 is further connected with an input/output interface 1005. The input/output interface 1005 is connected with an input unit 1006, an output unit 1007, a recording unit 1008, a communication unit 1009, and a drive 1010.

The input unit 1006 includes a key board, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magneto-optical disk, and a semiconductor memory.

On the computer 1000 configured as above, the series of above-described processing is executed by operation such that the CPU 1001 loads, for example, a program stored in the ROM 1002 and the recording unit 1008 onto the RAM 1003 via the input/output interface 1005 and the bus 1004 and executes the program.

The program executed by the computer 1000 (CPU 1001) can be stored, for example, in the removable recording medium 1011 as a package medium or the like and be provided. Alternatively, the program can be provided via a wired or wireless transmission medium including a local area network, the Internet, and digital satellite broadcasting.

On the computer 1000, the program can be installed in the recording unit 1008 via the input/output interface 1005, by attaching the removable recording medium 1011 to the drive 1010. In addition, the program can be received at the communication unit 1009 via a wired or wireless transmission medium and be installed in the recording unit 1008. Alternatively, the program can be installed in the ROM 1002 or the recording unit 1008 beforehand.

Here, in this description, processing executed by a computer in accordance with a program need not be performed in time series in the order described in the flowchart. That is, processing executed by the computer according to the program includes processing executed in parallel or separately (e.g. parallel processing, or object processing). In addition, the program may be processed by one computer (processor) or may be processed with distributed processing by a plurality of computers.

Note that embodiments of the present technology are not limited to the above-described embodiments but can be modified in a variety of ways within a scope of the present technology.

Note that the present technology can be configured as follows.

(1)

A reception apparatus including:

a reception unit that receives content; and a control unit that controls reproduction of the content on the basis of time correspondence information associating first time information provided from a transmission side of the content with second time information generated on a reception side of the content by a time axis according to the first time information corresponding to the second time information.

(2)

The reception apparatus according to (1), in which the content is transmitted in units of frames being a unit for transmitting data of the content, the first time information is included in the frame, and the control unit obtains the second time information according to a timing at which the first time information is received in a case where the first time information included in the frame is received, and manages the obtained second time information as the time correspondence information in association with the received first time information.

(3)

The reception apparatus according to (2), in which the control unit obtains the time correspondence information associating the first time information and the second time information at a certain point in the past, obtains the second time information at that point, calculates first time information at that point from a relationship among the second time information at that point, the second time information at a certain point in the past, and the first time information at a certain point in the past, and controls reproduction of the content on the basis of the calculated first time information at that point.

(4)

The reception apparatus according to (3), in which the time correspondence information is information indicating the time itself indicated by the first time information at a certain point in the past and the time itself indicated by the second time information at a certain point in the past, or information being a difference between the time indicated by the first time information at a certain point in the past and the time indicated by the second time information at a certain point in the past.

(5)

The reception apparatus according to any of (1) to (4), in which the content is broadcast content distributed by broadcast waves, the first time information is a Precision Time Protocol (PTP), and the second time information is a system time (System Time).

(6) The reception apparatus according to (2), in which the first time information is included in an arbitrary frame, and the time indicated by the first time information represents a time at a head position of the frame.

(7)

The reception apparatus according to any of (1) to (6), in which the control unit controls operation of:

an application for reproducing the content; and middleware for managing the time correspondence information, the middleware provides the time correspondence information in response to a request from the application, and the application controls reproduction of the content on the basis of the time correspondence information provided from the middleware.

(8)

The reception apparatus according to (2), in which the frame includes a preamble containing time metadata for correcting the first time information, and the control unit corrects the first time information on the basis of the time metadata.

(9)

The reception apparatus according to any of (1) to (8), in which the content is distributed in streaming distribution conforming to MPEG-Dynamic Adaptive Streaming over HTTP (MPEG-DASH), and the control unit controls reproduction of the content on the basis of Media Presentation Description (MPD) metadata.

(10)

A data processing method on a reception apparatus, the method including steps, executed by the reception apparatus, of:

receiving content; and controlling reproduction of the content on the basis of time correspondence information associating first time information provided from a transmission side of the content with second time information generated on a reception side of the content by a time axis according to the first time information corresponding to the second time information.

REFERENCE SIGNS LIST

1 Transmission system
10 Broadcast server
20 Client apparatus
30 Transmission line
101 RF demodulator
102 Broadcast middleware
103 Storage unit
104 Browser
105 DASH client
106 Decoder
107 Output unit
121 Application
1000 Computer
1001 CPU

The invention claimed is:

1. A reception apparatus comprising:
processing circuitry configured to
receive content; and
control reproduction of the content on a basis of time correspondence information associating first time information provided from a transmission side of the content with second time information generated on a reception side of the content,
wherein
time indicated by the first time information represents a particular position in a bootstrap or a preamble of a frame in which the first time information is provided,
the frame includes the preamble, which contains time metadata for correcting the first time information, and
the processing circuitry is further configured to correct the first time information based on the time metadata.

2. The reception apparatus according to claim 1,
wherein the content is transmitted in units of frames being a unit for transmitting data of the content,
the first time information is included in the frame, and the processing circuitry is further configured to
obtain the second time information according to a timing at which the first time information is received in a case where the first time information included in the frame is received, and
manage the obtained second time information as the time correspondence information in association with the received first time information.

3. The reception apparatus according to claim 2, wherein the processing circuitry is further configured to
obtain the time correspondence information associating the first time information and the second time information at a past time point,
obtain the second time information at a current time point,
calculate the first time information at the current time point from a relationship among the second time information at the current time point, the second time information at the past time point, and the first time information at the past time point, and
control the reproduction of the content on the basis of the calculated first time information at the current time point.

4. The reception apparatus according to claim 3,
wherein the time correspondence information is information indicating time indicated by the first time information at the past time point and time indicated by the second time information at the past time point, or information being a difference between the time indicated by the first time information at the past time point and the time indicated by the second time information at the past time point.

5. The reception apparatus according to claim 4,
wherein the content is broadcast content distributed by broadcast,
the first time information is a Precision Time Protocol (PTP), and
the second time information is a system time (System Time).

6. The reception apparatus according to claim 2,
wherein the first time information is included in at least one frame, and
the time indicated by the first time information represents a time at a head position of the frame in which the first time information is provided.

7. The reception apparatus according to claim 1,
wherein the processing circuitry is further configured to control operation of:
an application for reproducing the content; and
middleware for managing the time correspondence information,
the middleware provides the time correspondence information in response to a request from the application, and
the application controls reproduction of the content on the basis of the time correspondence information provided from the middleware.

8. The reception apparatus according to claim 1,
wherein the content is distributed in streaming distribution conforming to MPEG-Dynamic Adaptive Streaming over HTTP (MPEG-DASH), and
the processing circuitry is further configured to control reproduction of the content on the basis of Media Presentation Description (MPD) metadata.

9. A data processing method on a reception apparatus, the method comprising:
receiving content; and controlling, by processing circuitry of the reception apparatus, reproduction of the content on the basis of time correspondence information associating first time information provided from a transmission side of the content with second time information generated on a reception side of the content, wherein time indicated by the first time information represents a particular position in a bootstrap or a preamble of a frame in which the first time information is provided, the frame includes the preamble, which contains time metadata for correcting the first time information, and the method further comprises correcting the first time information based on the time metadata.

10. The method according to claim 9, wherein the content is transmitted in units of frames being a unit for transmitting data of the content, the first time information is included in the frame, and the method further comprises obtaining the second time information according to a timing at which the first time information is received in a case where the first time information included in the frame is received, and managing the obtained second time information as the time correspondence information in association with the received first time information.

11. The method according to claim 10, wherein the method further comprises:

obtaining the time correspondence information associating the first time information and the second time information at a past time point, obtaining the second time information at a current time point, calculating the first time information at the current time point from a relationship among the second time information at the current time point, the second time information at the past time point, and the first time information at the past time point, and controlling the reproduction of the content on the basis of the calculated first time information at the current time point.

12. The method according to claim 11, wherein the time correspondence information is information indicating time indicated by the first time information at the past time point and time indicated by the second time information at the past time point, or information being a difference between the time indicated by the first time information at the past time point and the time indicated by the second time information at the past time point.

13. The method according to claim 12, wherein the content is broadcast content distributed by broadcast, the first time information is a Precision Time Protocol (PTP), and the second time information is a system time (System Time).

14. The method according to claim 10, wherein the first time information is included in at least one frame, and the time indicated by the first time information represents a time at a head position of the frame in which the first time information is provided.

15. The method according to claim 9, wherein the method further comprises controlling operation of:

an application for reproducing the content; and middleware for managing the time correspondence information, the middleware provides the time correspondence information in response to a request from the application, and the application controls reproduction of the content on the basis of the time correspondence information provided from the middleware.

16. The method according to claim 9, wherein the content is distributed in streaming distribution conforming to MPEG-Dynamic Adaptive Streaming over HTTP (MPEG-DASH), and the method further comprises controlling reproduction of the content on the basis of Media Presentation Description (MPD) metadata.

* * * * *